(12) United States Patent
Sannino et al.

(10) Patent No.: US 6,504,682 B1
(45) Date of Patent: Jan. 7, 2003

(54) DISC HEAD SLIDER HAVING RECESSED, CHANNELED RAILS FOR REDUCED STICTION

(75) Inventors: Anthony P. Sannino, Shakopee, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/549,424

(22) Filed: Apr. 13, 2000

Related U.S. Application Data

(60) Provisional application No. 60/168,796, filed on Dec. 2, 1999.

(51) Int. Cl.[7] .............................................. G11B 21/21
(52) U.S. Cl. .............................. 360/235.8; 360/236.1; 360/236.2; 360/236.3
(58) Field of Search .......................... 360/235.4–235.8, 360/236.1–236.6, 236.8, 236.9, 237

(56) References Cited

U.S. PATENT DOCUMENTS

| | | |
|---|---|---|
| 4,212,044 A | 7/1980 | Plotto |
| 4,218,715 A | 8/1980 | Garnier |
| 4,553,184 A | 11/1985 | Ogishima |
| 4,646,180 A | 2/1987 | Ohtsubo |
| 4,984,114 A | 1/1991 | Takeuchi et al. |
| 5,086,360 A | 2/1992 | Smith et al. |
| 5,128,822 A | 7/1992 | Chapin et al. |
| 5,200,868 A | 4/1993 | Chapin et al. |
| 5,218,494 A | 6/1993 | Chapin et al. |
| 5,317,465 A | 5/1994 | Chapin et al. |
| 5,343,343 A | 8/1994 | Chapin |
| 5,359,480 A | 10/1994 | Nepela et al. |
| 5,490,026 A | 2/1996 | Dorius et al. |
| 5,513,056 A | 4/1996 | Kawasaki et al. |
| 5,515,219 A | 5/1996 | Ihrke et al. |
| 5,550,693 A | 8/1996 | Hendriks et al. |
| 5,624,581 A | 4/1997 | Ihrke et al. |
| 5,636,085 A | 6/1997 | Jones et al. |
| 5,737,151 A | 4/1998 | Bolasna et al. |
| 5,761,004 A | 6/1998 | Peck |
| 5,796,551 A | 8/1998 | Samuelson |
| 5,953,181 A | 9/1999 | Utsunomiya |
| 5,963,396 A | 10/1999 | Burga et al. |
| 5,973,881 A | 10/1999 | Ajiki |
| 6,115,219 A * | 9/2000 | Hall .......................... 360/236.9 |
| 6,188,547 B1 * | 2/2001 | Gui et al. ................. 360/236.5 |

FOREIGN PATENT DOCUMENTS

| | | |
|---|---|---|
| EP | 0 747 890 | 12/1996 |
| JP | 60-242548 | 12/1985 |
| JP | 1-211383 | 8/1989 |
| JP | 1-245480 | 9/1989 |
| JP | 1-319188 | 12/1989 |
| JP | 3-132981 | 6/1991 |
| WO | WO 86/03048 | 5/1986 |

* cited by examiner

*Primary Examiner*—Craig A. Renner
(74) *Attorney, Agent, or Firm*—Westman, Champlin & Kelly

(57) ABSTRACT

A disc head slider includes a cavity dam, a subambient pressure cavity and first and second elongated rails. The first and second rails are disposed about the subambient pressure cavity. Each of the rails has a rail width measured from an inner rail edge to an outer rail edge, a leading bearing surface, a trailing bearing surface, and a recessed area extending between the leading and trailing bearing surfaces. The recessed area is recessed from the bearing surfaces and raised from the cavity floor, across the rail width. First and second convergent channels are recessed within the trailing bearing surfaces of the first and second rails, respectively. Each channel has a leading channel end open to fluid flow from the respective recessed area, non-divergent channel side walls and a trailing channel end closed to the fluid flow and forward of a localized region of the respective trailing bearing surface.

19 Claims, 7 Drawing Sheets

DISC HEAD SLIDER HAVING RECESSED, CHANNELED RAILS FOR REDUCED STICTION

CROSS-REFERENCE TO RELATED APPLICATION

This application claims the benefit of U.S. Provisional Application Serial No. 60/168,796, entitled "SIDE RAIL-TRENCHED AIRBEARING FOR REDUCED STICTION FOR SLIP APPLICATIONS," filed Dec. 2, 1999.

Cross reference is also made to U.S. Ser. No. 09/398,993, entitled "CONVERGENT CHANNEL, TRENCHED DISC HEAD SLIDER," filed Sep. 17, 1999, and to U.S. Ser. No. 09/548,148, entitled "DISC HEAD SLIDER HAVING RECESSED, TRENCHED RAILS FOR ENHANCED DAMPING," filed on even date herewith.

BACKGROUND OF THE INVENTION

The present invention relates to disc drive data storage systems and, more particularly, to a disc drive data storage system having a slider, which reduces stiction with the disc surface while providing sufficient bearing stiffness.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a high pitch stiffness.

The bearing clearance between the slider and the disc surface at the recording head is an important parameter to disc drive performance. As average flying heights continue to be reduced, it is important to control several metrics of flying height performance, such as flying height sensitivity to process variations, ambient pressure (e.g., altitude) variations, changes in radial position of the slider over the disc surface and resulting head skew, and quick movements of the slider from one radial position to another radial position.

The above-mentioned sensitivities are reduced by providing the slider with a high bearing stiffness in the pitch and roll directions. To achieve high pitch and roll stiffness, air bearings have utilized geometries that distribute the positive pressure away from the center of the slider. However, with some bearing geometries, it is difficult to generate sufficient localized pressure along certain areas of the bearing surface. For example, it is difficult to generate localized positive pressure near the trailing edge of a slider having truncated side rails and a discrete center pad positioned at the trailing edge.

Also, the slider should take off from the disc surface as quickly as possible after the start of disc rotation. Therefore, it is desired to limit the sticking friction ("stiction") between the slider and the disc surface during the start and stop of disc rotation. One method of limiting stiction is to provide the disc surface with a textured landing zone, which reduces the contact area between the slider and the disc surface when the slider is at rest within the landing zone. However, as the flying heights are reduced to achieve higher recording densities, it becomes more difficult to implement a textured landing zone since the flying height can become less than the height of the roughness peaks that is required to limit the stiction forces in the textured landing zone.

This difficulty has lead to the use of head-disc interfaces in which some of the landing zone roughness is transferred to the bearing surface of the slider body. A textured bearing surface is typically achieved by forming discrete pads on the bearing surfaces. These pads provide small surface areas for contacting the disc surface without significantly effecting the bearing characteristics.

However, the use of textured bearing surfaces makes it more difficult to maintain the desired spacing between the head and the disc within the smooth data zone due to the additional separation caused by the pads. The head is typically positioned along the trailing edge of the slider body. In order to prevent the pads from interfering with the head-to-disc spacing, the pads are typically positioned somewhat forward from the trailing edge. This will allow the head to remain at the close-point flying height when the slider flies with a positive pitch angle. If the pads are positioned only a moderate distance from the trailing edge, the slider must fly with a relatively high pitch angle to maintain the desired head-to-media separation. A higher pitch angle decreases the bearing stiffness, and is typically detrimental to manufacturing sensitivity. If the pads are positioned at a large distance from the trailing edge, there will be a relatively large area on the bearing surface that has no pads. This can cause the slider to tip backwards if the disc oscillates backward and forward slightly during shut-down as the remaining energy in the disc and spindle motor coils dissipates. Backward tipping induces contact between the trailing edge of the slider and the disc surface, which can result in a disc lube meniscus being formed at the area of contact and an unacceptable stiction force if the disc surface is too smooth.

A slider is desired, which minimizes stiction with the disc surface while maintaining a low head-disc spacing and high bearing stiffness properties.

SUMMARY OF THE INVENTION

One aspect of the present invention relates to a disc head slider, which, includes a cavity dam, a subambient pressure cavity and first and second elongated rails. The subambient pressure cavity trails the cavity dam and has a cavity floor. The first and second rails are disposed about the subambient pressure cavity. Each of the rails has a rail width measured from an inner rail edge to an outer rail edge, a leading bearing surface, a trailing bearing surface, and a recessed area extending between the leading and trailing bearing surfaces. The recessed area is recessed from the bearing surfaces and raised from the cavity floor, across the rail width. First and second convergent channels are recessed within the trailing bearing surfaces of the first and second rails, respectively. Each channel has a leading channel end open to fluid flow from the respective recessed area, non-divergent channel side walls and a trailing channel end closed to the fluid flow and forward of a localized region of the respective trailing bearing surface.

Another aspect of the present invention relates to a disc drive assembly, which includes a housing, a disc, an actuator and a slider. The disc is rotatable about a central axis within the housing and has a recording surface with a data area and a landing area, which are non-textured. The actuator is mounted within the housing. The slider is supported over the recording surface by the actuator and includes a cavity dam, a subambient pressure cavity and first and second elongated rails. The subambient pressure cavity trails the cavity dam and has a cavity floor. The first and second rails are disposed about the subambient pressure cavity. Each of the rails has a rail width measured from an inner rail edge to an outer rail edge, a leading bearing surface, a trailing bearing surface, and a recessed area extending between the leading and trailing bearing surfaces. The recessed area is recessed from the bearing surfaces and raised from the cavity floor, across the rail width. First and second convergent channels are recessed within the trailing bearing surfaces of the first and second rails, respectively. Each channel has a leading channel end open to fluid flow from the respective recessed area, non-divergent channel side walls and a trailing channel end closed to the fluid flow and forward of a localized region of the respective trailing bearing surface.

Yet another aspect of the present invention relates to a disc drive assembly, which includes a disc and a slider. The disc is rotatable about a central axis and has a data area and a slider landing area, which are non-textured. The slider is supported over the disc and has elongated rails with convergent channels and recessed waist areas for generating a fluid bearing between the slider and the disc as the disc rotates beneath the slider about the central axis and for reducing stiction between the slider and the disc when the slider is at rest within the landing zone.

DETAILED DESCRIPTION OF THE PREFERRED EMBODIMENTS

Figure 1:
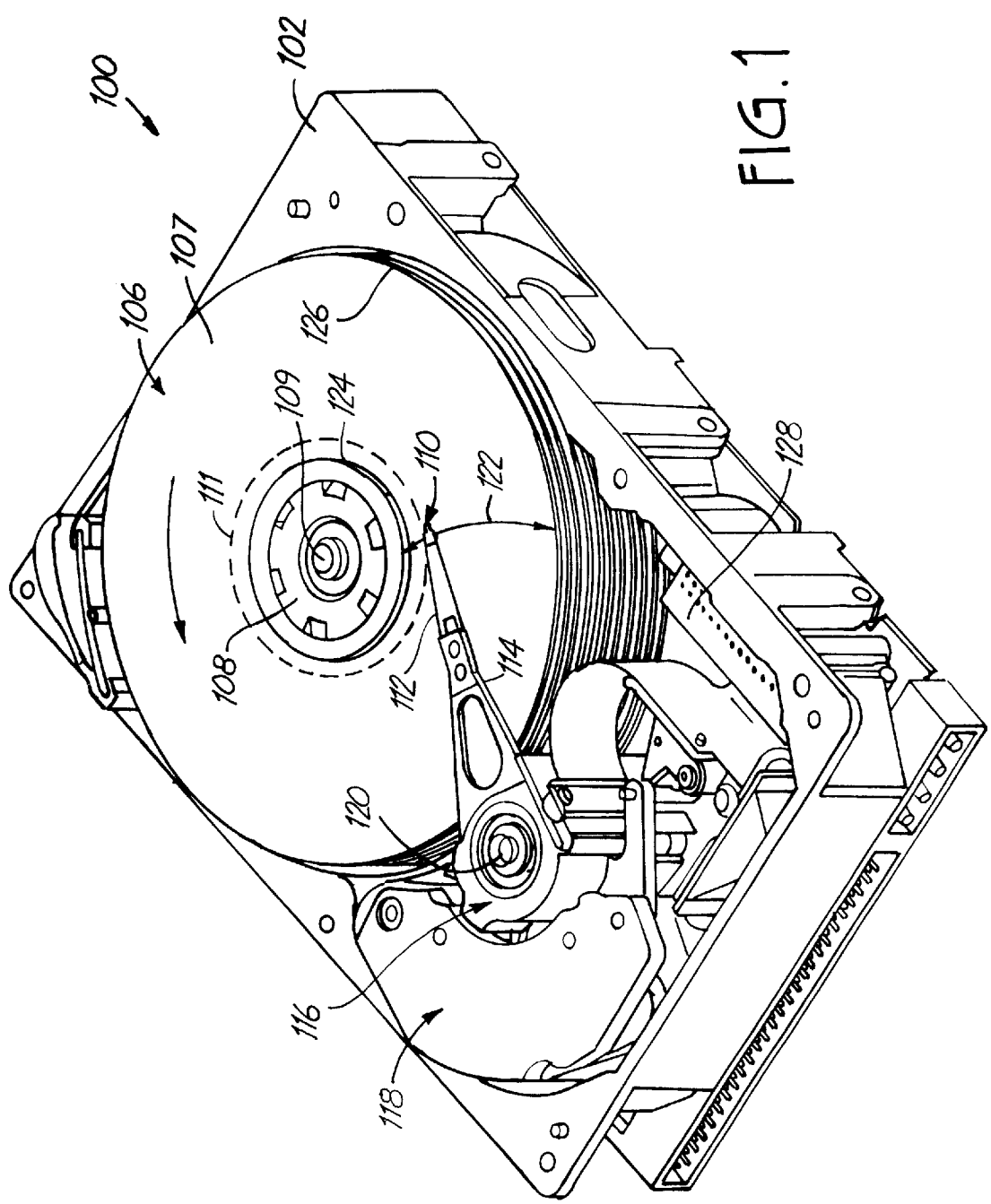
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that minimizes stiction with the disc surface by generating discrete areas of localized pressure while reducing contact area with the disc surface to prevent meniscus formation of disc lubrication at the slider "belly" location. This allows discs 107 to be fabricated with a smooth or less-textured slider landing zone 111 and allows for a lower pole tip fly height, as compared to conventional textured landing zones, without causing unreasonably high stiction forces between the slider and the disc surface.

Figure 2:
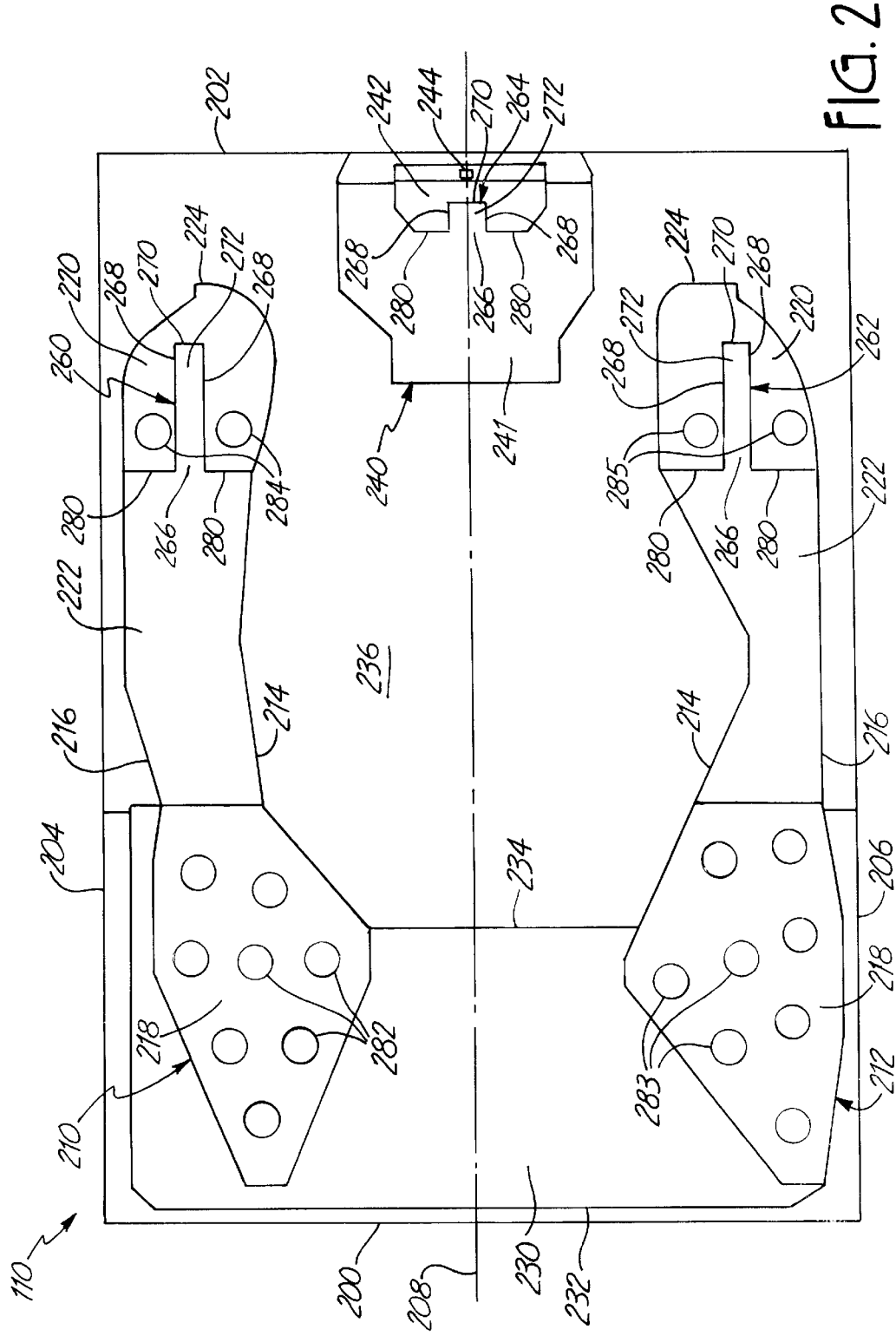
FIG. 2 is a bottom plan view of a slider shown in FIG. 1, as viewed from the surface of a disc, according to one embodiment of the present invention.

FIG. 2 is a bottom plan view of one of the sliders 110 of FIG. 1, as viewed from the surface of disc 107. Slider 110 has a leading edge 200, a trailing edge 202, side edges 204 and 206, and a lateral center line 208. Elongated, raised side rails 210 and 212 are positioned along side edges 204 and 206, respectively. Rails 210 and 212 extend generally from leading slider edge 200 toward trailing slider edge 202 and terminate prior to trailing edge 202.

Each rail 210 and 212 has an inside rail edge 214, an outside rail edge 216, a leading bearing surface 218, a trailing bearing surface 220 and a recessed waist portion 222. Recessed waist portion 222 extends from leading bearing surface 218 to trailing bearing surface 220. In one embodiment, waist portions 222 are generally parallel to and recessed from bearing surfaces 218 and 220 by a step depth of 0.1 to 0.5 um, for example, such that the waist portions reduce the contact area of slider 110 when at rest on the surface of disc 107. The recessed waist portions develop substantially ambient pressure during flight. Other depths can also be used in alternative embodiments.

A cavity dam 230 extends between rails 210 and 212, along leading slider edge 200. Cavity dam 230 has a leading edge 232 and a trailing edge 234. Cavity dam 230 and side rails 210 and 212 define a subambient pressure cavity 236, which trails cavity dam 230 relative to a direction of air flow from the leading slider edge 200 toward trailing slider edge 202. In one embodiment, subambient pressure cavity 236 is recessed from leading and trailing bearing surfaces 218 and 220 by 1 to 3 um. Although recessed waist portions 222 are recessed from bearing surfaces 218 and 220, waist portions 222 remain raised from the floor of cavity 236 such that the waist portions 222 continue to define the shape of the cavity 236 and contain subambient pressure within cavity 236.

In one embodiment, cavity dam 230 is generally parallel to and recessed from bearing surfaces 218 and 220 by a step depth of 0.1 to 0.5 um, for example. Other depths can also be used. In addition, cavity dam 230 can be formed with a tapered leading edge in alternative embodiments, if desired.

A raised center pad or rail 240 is positioned along trailing slider edge 202 and is centered along lateral center line 208. In alternative embodiments, center pad 240 can be skewed or offset with respect to line 208. Center pad 240 has a leading step surface 241 and a bearing surface 242. Leading step surface 241 is generally parallel to and recessed from bearing surface 242 by a step depth of 0.1 to 0.5 um, for example, for providing pressurization of bearing surface 242 from air flow venting from cavity 236. Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) when slider 110 flies with a positive pitch angle. With a positive pitch angle, trailing slider edge 202 is closer to the surface of disc 107 than leading slider edge 200.

Rails 210 and 212 terminate prior to trailing slider edge 202 to allow slider 110 to roll about lateral center line 208 without risking contact between trailing rail edges 224 and the disc surface. Therefore, trailing edge of center pad 240 remains the closest location on slider 110 to the disc surface during flight at relatively large:roll angles, thereby improving read and write performance. However, truncating side rails 210 and 212 reduces the amount of positive pressure developed along the rails near trailing slider edge 202, which reduces pitch and roll stiffness.

In order to limit the reduction in pitch and roll stiffness, slider 110 further includes convergent channel features 260, 262 and 264, which are recessed within trailing bearing surfaces 220 of side rails 210 and 212 and within bearing surface 242 of center rail 240. These channels can also be referred to as trenches. Channels 260, 262 and 264 each have a leading channel end 266, non-divergent side walls 268, a trailing channel end 270 and a channel floor (or "step surface") 272. Channels 260, 262 and 264 also have a side wall 280 to either side of the leading channel ends 266. Channels 260, 262 and 264 are formed through photolithography processes such as ion milling, chemical etching or reactive ion etching (RIE). With these processes, the depth and location of the channels can be accurately controlled. In one embodiment, channel floors 272 of channels 260 and 262 are coplanar and contiguous with recessed waist portions 222 of rails 210 and 212, while channel floor 272 of channels 264 is coplanar and contiguous with leading step surface 241 of center rail 240.

In channels 260 and 262, leading channel end 266 is open to fluid flow from recessed areas 222 of the side rails 210 and 212, respectively. However, trailing channel end 270 is closed to the fluid flow. A portion of the fluid flow from recessed areas 222 is directed into channels 260 and 262 and is forced to exit the channels over trailing channels ends 270. This creates localized positive pressure areas on trailing bearing surfaces 220 rearward of trailing channel ends 270. In one embodiment, trailing bearing surfaces 220 have a length measured from trailing channel ends 270 to trailing rail edges 224 that is equal to or greater than the width of channels 260 and 262, as measured between side walls 268. This provides enough of a bearing surface on which the localized positive pressure can act. The localized positive pressure developed on trailing bearing surfaces 220 increases the roll stiffness of slider 110.

With respect to channel 264 on center rail 240, the leading end 266 of this channel is open to fluid flow from cavity 236, and trailing channel end 270 is closed to the fluid flow. A portion of the fluid flow from cavity 236 is directed into channel 264 and is forced to exit the channel over trailing channel end 270. Again, this creates a localized positive pressure area on bearing surface 242, rearward of trailing channel end 270. In one embodiment, center rail bearing surface 242 has a length between trailing channel end 270 and trailing slider edge 202 that is at least the width of channel 264, as measured between side walls 268. The localized positive pressure developed on center rail bearing surface 242 increases the pitch stiffness of slider 110.

During operation, the side walls to either side of leading channel ends 266 present themselves as a substantial pressure rise to the local fluid flow. Since the opening to each channel, at leading channel ends 266, does not have the same pressure rise, it is seen as a preferential path for the fluid flow to travel. Once the fluid flow enters channels 260, 262 and 264, the flow is essentially bounded by channel side walls 268 and trailing channel end 270 and is forced to rise over trailing channel end 270. This creates the localized pressure areas at discrete regions near trailing slider edge 202. Channels 260, 262 and 264 can be symmetrical about lateral center line 208, as shown in FIG. 2, or can be asymmetrical to provide preferential pressurization at certain slider skew angles.

The size and intensity of the localized positive pressure areas depend on the channel length to width ratio, the absolute sizes of the channels and the depth and shape of the channel floors. In one embodiment, the ratio of the channel lengths to the channel widths range from 0.5 to 5.0, but may vary outside that range depending the design purposes of the channel feature. In another embodiment, the length to width ratio ranges from 2.0 to 2.5.

Slider 110 further includes raised pads or "bumps" 282–285, which extend slightly from bearing surfaces 218 and 220. In one embodiment, pads 282–285 extend from bearing surfaces 218 and 220 by about 10 nanometers (nm) to about 30 nm. Pads 282–285 provide a slight separation between bearing surfaces 218 and 220 and the disc surface when slider 110 is at rest on the disc surface, while having a surface area that has little or no effect on the overall flying characteristics of slider 110. This separation significantly reduces the stiction forces between the slider and the disc surface. Pads 282–285 can have a variety of cross-sectional shapes, such as circular, rectangular or elongated ovals. Other shapes can also be used.

Conventional disc head sliders, including slider 110 shown in FIG. 2, are fabricated such that the bearing surfaces have a positive curvature along the length of the slider, as measured from its leading edge to its trailing edge. Length curvature is also known as crown curvature. A proper setting of length curvature improves flying height variability over bearing conditions, improves wear on the slider and the disc surface, and improves takeoff performance by further reducing stiction between the slider and the disc surface. However, this curvature can create an undesirably low spacing between the center portions of the rails in conventional sliders when those sliders are at rest on the disc surface, particularly with sliders having bumps or pads near the four corners of the slider. Slider 110 avoids this difficulty by recessing waist portions 222.

Figure 3:
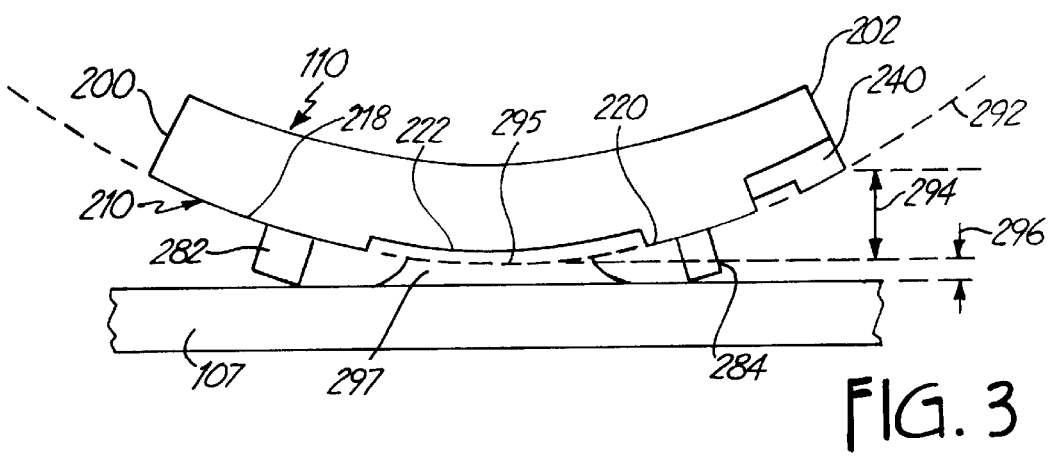
FIG. 3 is a diagram, which schematically illustrates a side view of the slider shown in FIG. 2.

FIG. 3 is a diagram, which schematically illustrates a side view of slider 110, with the length curvature and the height of pads 282 and 284 greatly exaggerated for clarity. Slider 110 has a length curvature 292 along bearing surfaces 218, 220 and 242. A common measurement of the length curvature or "crown height" is the difference between the highest point along the length of slider 110 and the lowest point along the length of slider 110. For example, length curvature 292 can have a crown height 294 of 12 nm to 17 nm. If waist portions 222 were not recessed from bearing surfaces 218 and 220, length curvature 292 would cause the central portions of the rails (shown by dashed line 295) to have a small spacing 296 from the surface of disc 107. If pads 282 and 284 have a height of 18 nm to 32 nm, for example, then spacing 296 would be as small as 10 nm to 20 nm. Under capillary pressure, menisci of the disc lubrication under the slider surface are pulled into this narrow-gap region, leading to a potentially large additional meniscus 297. This meniscus can lead to a large stiction force between slider 110 and disc 107, which is linearly proportional to the inverse of the "belly height", which is defined by the difference between the height of pads 282 and 284 and the effective crown height 294 (i.e., the crown height between two pads on the same rail). This is particularly true if the slider landing zone on the disc surface is too smooth. However, waist portions 222 on slider 110 are recessed from bearing surfaces 218 and 220, which significantly increases the "belly height" and reduces the potential for meniscus 297 to form. This further reduces stiction between slider 110 and the surface of disc 107.

Figure 4:
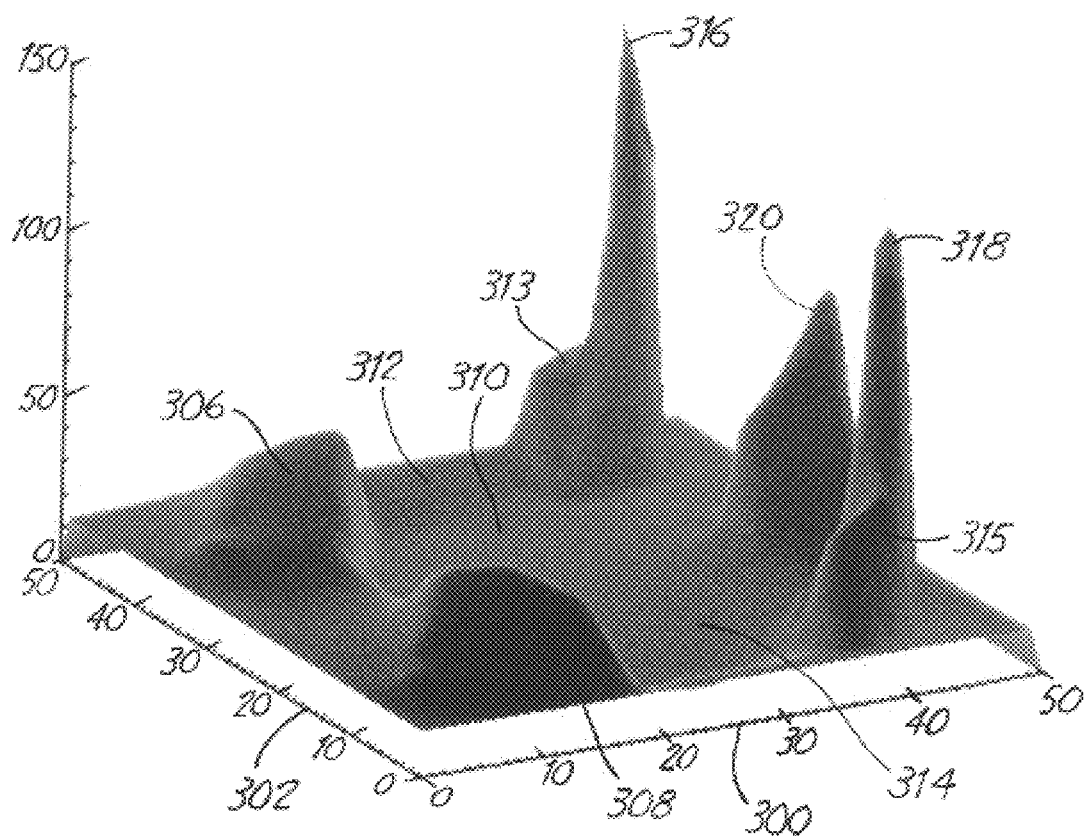
FIG. 4 is a three dimensional diagram illustrating a pressure profile across the bearing surfaces of the slider shown in FIG. 2.

FIG. 4 is a three dimensional diagram illustrating a pressure profile across the bearing surfaces of slider 110 according to one embodiment of the present invention. Axis 300 represents distance along side edges 204 and 206 of slider 110. Axis 302 represents distance along leading slider edge 200. Axis 304 represents pressure amplitude. Leading bearing surfaces 218 of side rails 210 and 212 generate moderate positive pressure areas 306 and 308, respectively, just aft of slider leading edge 200. Subambient pressure cavity 236 generates subambient pressure in area 310. Recessed waist portions 222 of side rails 210 and 212 are at substantially ambient pressure in areas 312 and 314. However, the recessed waist portions 222 still serve to confine subambient pressure within area 310. Trailing bearing surfaces 220 of side rails 210 and 212 generate moderate positive pressure in areas 313 and 315 due to the recess of waist portions 222. However, channels 260 and 262 generate high localized pressure peaks 316 and 318, respectively, which compensate for the pressure loss over waist portions 222 and provide high roll stiffness. In fact, channels 260 and 262 increase roll stiffness to larger levels than conventional negative pressure air bearing (NPAB) sliders having no channel features in the side rails. Likewise, channel 264 in center rail 240 generates a high localized pressure peak 320 near trailing slider edge 202, which provides high pitch stiffness.

Recessed waist -portions 222 (shown in FIG. 2) therefore have two primary functions. First, recessed waist portions 222 allow pressurization of channels 260 and 262 for producing the high peak pressures 316 and 318 shown in FIG. 4. Second, recessed waist portions 222 prevent meniscus formation at the slider "belly" location as shown in FIG. 3, which would otherwise generate large stiction forces for a slider having a positive crown curvature.

Figure 5:
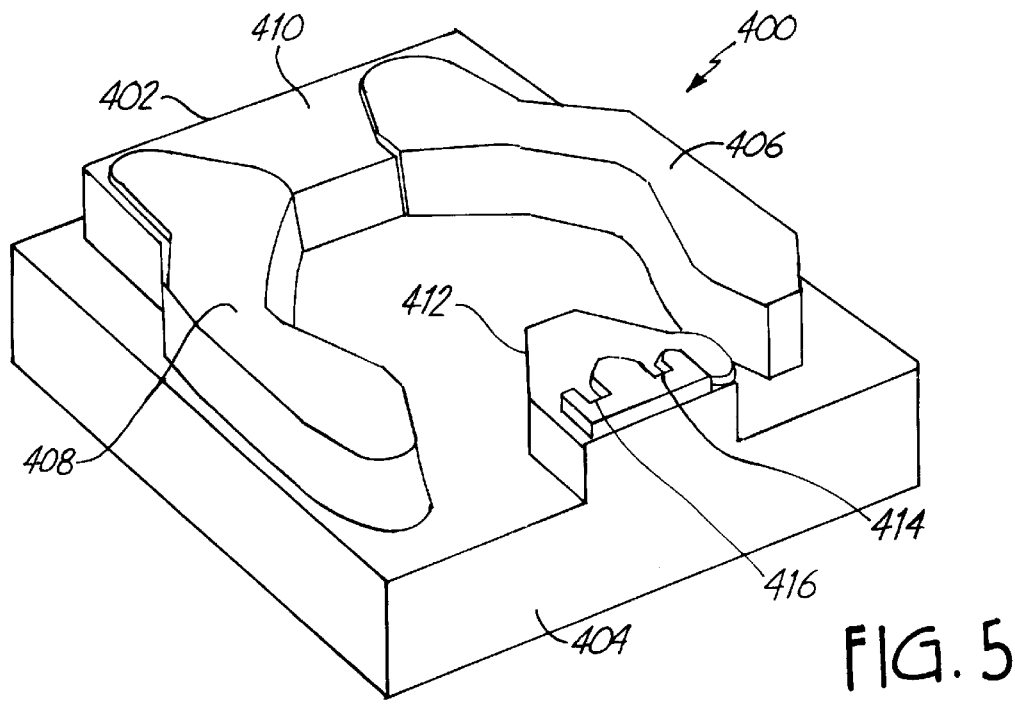
FIG. 5 is a bottom, perspective view of a slider, which does not have convergent channel features or recessed waist portions formed in the side rails.

The simulated bearing stiffness of slider 110, shown in FIG. 2, was compared with the simulated bearing stiffness of slider 400, shown in FIG. 5, which does not have convergent channel features or recessed waist portions formed in the side rails. Slider 400 has a leading edge 402, a trailing edge 404, side rails 406 and 408, cavity dam 410 and center rail 412. Center rail 412 has convergent channel features 414 and 416 positioned near trailing edge 404.

Table 1 shows the vertical, roll and pitch stiffness for slider 400 shown in FIG. 5 at the inner disc diameter, middle disc diameter and outer disc diameter.

TABLE 1

| | Stiffness | | |
| --- | --- | --- | --- |
| Location | Vertical Stiffness (gm/in) | Roll Stiffness (gm-in/rad) | Pitch Stiffness (gm-in/rad) |
| Inner Diameter | 6646 | .649 | 2.378 |
| Med Diameter | 7166 | .518 | 2.931 |
| Outer Diameter | 6324 | .354 | 2.782 |

Table 2 shows the vertical, roll and pitch stiffnesses of slider 110 shown in FIG. 2 at the inner disc diameter, middle disc diameter and outer disc diameter.

TABLE 2

| | Stiffness | | |
| --- | --- | --- | --- |
| Location | Vertical Stiffness (gm/in) | Roll Stiffness (gm-in/rad) | Pitch Stiffness (gm-in/rad) |
| Inner Diameter | 7077 | .797 | 2.673 |
| Med Diameter | 7584 | .785 | 2.981 |
| Outer Diameter | 7552 | .772 | 2.990 |

Comparing Tables 1 and 2, it can be seen that roll stiffness is increased by 23% at the inner disc diameter and 120% at the outer disc diameter when convergent channel features are added to the side rails. Also, vertical stiffness and pitch stiffness of the two sliders remain comparable to one another.

In addition, the convergent channel features, 260, 262 and 264 decrease the surface areas of the respective bearing surfaces, which decreases meniscus forces generated by the disc lube along these areas in case slider 110 tips backward after the spindown and stop of disc rotation. During operation, when power to disc drive 100 (shown in FIG. 1)

is turned off, the rotational velocity of discs 107 decrease to zero. Inertia in discs 107 and back electromotive force (EMF) in the spindle motor windings can cause discs 107 to oscillate backward and forward slightly until all of the remaining energy is dissipated. Under certain operating conditions, the backward rotation of discs 107 can cause slider 110 to tip backwards about the rear most pads 284–285 causing trailing bearing surfaces 220 and center rail bearing surface 242 to contact the disc surface. The reduced surface area of these bearing surfaces with the addition of channel features 260, 262 and 264 results in a reduction in stiction with the disc surface in the case of backward tipping.

With the decreases meniscus force formation and the decreases in stiction with the disc surface resulting from the geometry of slider 110 (shown in FIG. 2 for example), slider 110 can be used with disc surfaces having little or no texture in the slider landing zone 111 (shown in FIG. 1). A smoother landing zone would permit slider 110 to take off from the disc surface and fly at heights lower than 0.5 microinches. Landing zone 111 no longer needs a rough texture in order to decrease stiction. A rough texture, as used in conventional disc drives, would otherwise limit the slider flying height to a height that is at least as great as the texture roughness in the landing zone to enable the slider to transition between the smooth user data area and the roughly textured landing zone.

Figure 6:
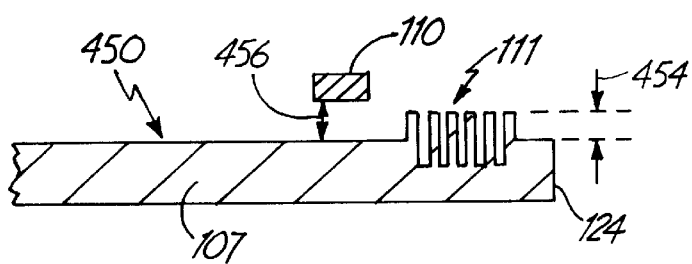
FIG. 6 schematically represents a cross-sectional view of a disc and slider combination, with the disc having a traditional, roughly textured landing zone and a smooth user data area.

FIG. 6 schematically represents a cross-sectional view of disc 107 and slider 110, with disc 107 having a traditional, roughly textured landing zone 111 and a smooth user data area 450 near inner diameter 124. Textured landing zone 111 has a roughness with a height 454 above the smooth surface of user data area 450. Slider 110 must therefore have a flying height 456 that is at least as great as height 454 in order for slider 110 to transition between smooth user data area 450 and rough landing zone 111.

Figure 7:
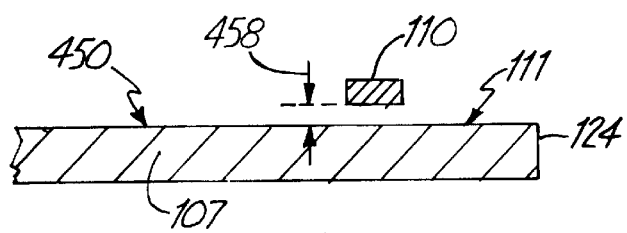
FIG. 7, schematically represents a cross-sectional view of a disc and slider combination, with the disc having a smooth landing zone and a smooth user data area.

As mentioned above, the geometric features of slider 110 shown in FIG. 2, for example, allow slider 110 to be used with discs having a less textured or even smooth landing zone, as shown in FIG. 7. In FIG. 7, landing zone 111 is smooth, with little or no texture. The limits on the flying height 458 of slider 110 are therefore decoupled from the roughness of landing zone 111. With texture no longer being required on the disc surface, the discs can be made with less expensive, smooth substrates such as glass substrates in addition to the conventional aluminum substrates. Removing the texture from the disc surface also simplifies and speeds fabrication of the discs, which can lead to a further reduction in fabrication costs.

Figure 8:
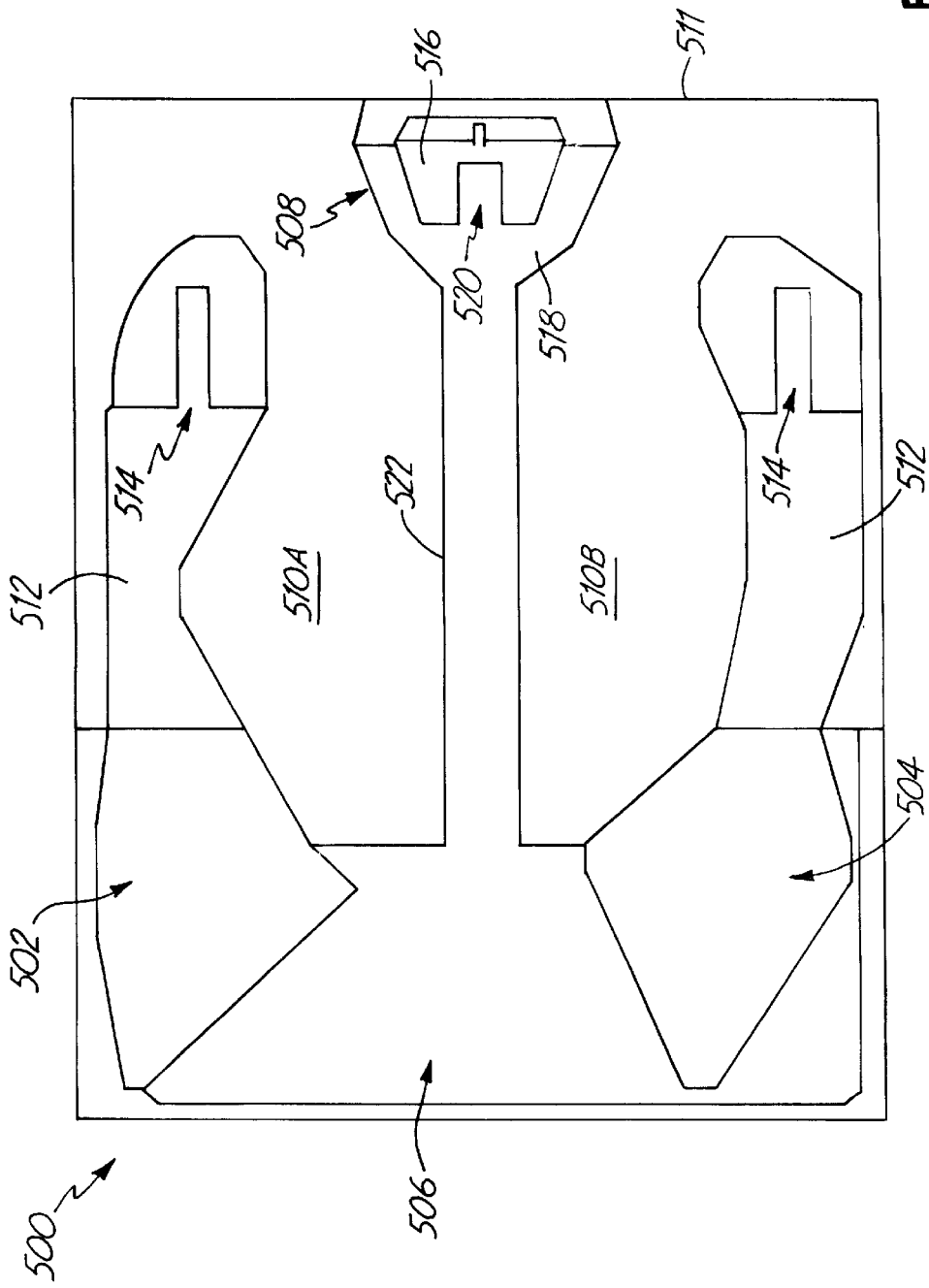
FIG. 8 is a bottom plan view of a slider having an elongated center rail according to an alternative embodiment of the present invention.

FIG. 8 is a bottom plan view of a slider 500 according to another alternative embodiment of the present invention. Slider 500 has side rails 502 and 504, cavity dam 506, center rail 508 and divided cavity portions 510A and 510B. Side rails 502 and 504 and cavity dam 506 are similar to the side rails and cavity dam shown in the embodiment of FIG. 2. Side rails 502 and 504 include recessed waist portions 512 and convergent channel features 514. Center rail 508 is elongated and extends from trailing slider edge 511, to cavity dam 506. Center rail 508 includes raised center rail bearing surface 516, leading step surface 518 and convergent channel feature 520. In the embodiment shown in FIG. 8, leading step surface 518 extends from center pad bearing surface 516 to cavity dam 506. Leading step surface 518 is coplanar and contiguous with cavity dam 506, which is recessed from the bearing surfaces formed by side rails 502 and 504 and center rail 508.

Figure 9:
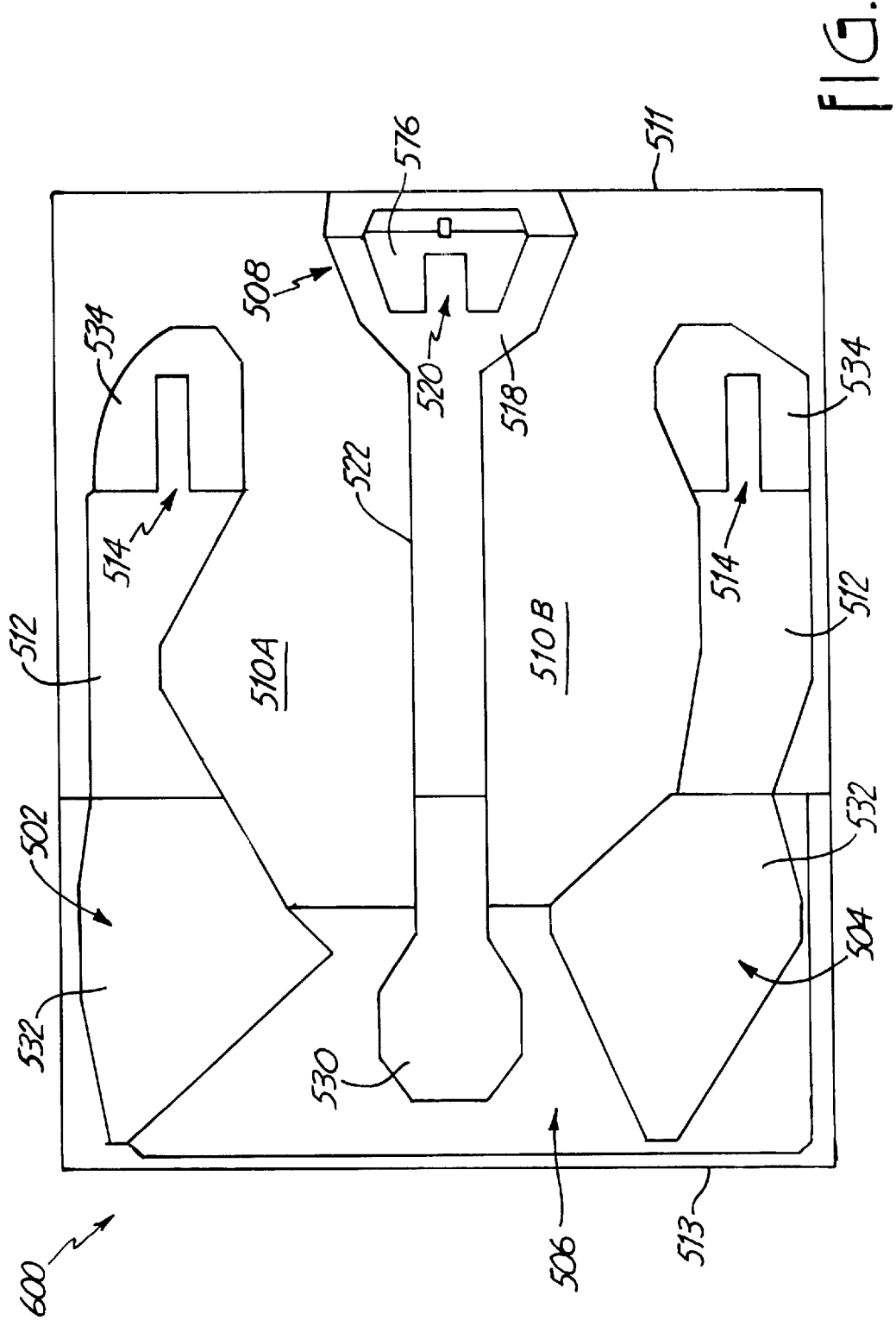
FIG. 9 is a bottom plan view of a slider having an elongated center rail and a raised leading center pad according to another alternative embodiment of the present invention.

FIG. 9 is a bottom plan view of a slider 600 according to another alternative embodiment of the present invention. The same reference numerals are used in FIG. 9 as were used in FIG. 8 for the same or similar elements. Slider 600 is similar to slider 500 (shown in FIG. 8), but further includes a leading center rail bearing surface 530, which is formed partially on cavity dam 506 and partially on rectangular section 522. Leading center rail bearing surface 530 is raised from cavity dam 506 and is coplanar with leading and trailing bearing surfaces 532 and 534 of side rails 502 and 504 and with center rail bearing surface 516. Leading center rail bearing surface 530 provides increased pressurization near leading slider edge 513 while still maintaining a recessed step surface 518 for pressurizing convergent channel feature 520. Other alternative geometries can also be used.

Although the present invention has been described with reference to preferred embodiments, workers skilled in the art will recognize that changes may be made in form and detail without departing from the spirit and scope of the invention.

What is claimed is:

1. A disc head slider comprising:
   a cavity dam;
   a subambient pressure cavity, which trails the cavity dam and has a cavity floor;
   first and second elongated rails disposed about the subambient pressure cavity, wherein each of the rails comprises a rail width measured from an inner rail edge to an outer rail edge, a leading bearing surface, a trailing bearing surface, and a recessed area extending between the leading and trailing bearing surfaces, which is recessed from the bearing surfaces and raised from the cavity floor, across the rail width; and
   first and second convergent channels, which are recessed within the trailing bearing surfaces of the first and second rails respectively, wherein each channel comprises a leading channel end open to fluid flow from the respective recessed area, non-divergent channel side walls and a trailing channel end closed to the fluid flow and forward of a localized region of the respective trailing bearing surface.

2. The disc head slider of claim 1 and further comprising:
   a leading slider edge;
   a trailing slider edge;
   a length measured from the leading slider edge to the trailing slider edge;
   a positive crown curvature in the bearing surfaces along the slider length, wherein the crown curvature has a peak between the leading slider edge and the trailing slider edge; and
   the recessed areas of the first and second rails are positioned at the peak, along the slider length.

3. The disc head slider of claim 1 wherein:
   the first and second convergent channels each comprise a channel floor, which is coplanar and contiguous with the recessed areas of the first and second rails, respectively.

4. The disc head slider of claim 3 wherein the cavity dam, the channel floor and the recessed areas are recessed from the leading and trailing bearing surfaces by 0.1 to 0.5 microns, and the subambient pressure cavity is recessed from the leading and trailing bearing surfaces by 1 to 3 microns.

5. The disc head slider of claim 1 wherein the subambient pressure cavity has a shape that is defined by the cavity dam and the inner edges of the first and second rails, as the inner edges extend along the leading bearing surfaces, the recessed areas and the trailing bearing surfaces.

6. The disc head slider of claim 1 and further comprising a leading slider edge, a trailing slider edge and a length measured from the leading slider edge to the trailing slider edge and wherein:

the non-divergent channel side walls are spaced from one another by a channel width; and the localized region of the respective trailing bearing surface has a region length, which is measured along the slider length and is at least as long as the channel width.

7. The disc head slider of claim 1 and further comprising:

at least one raised pad protruding from each of the leading and trailing bearing surfaces of the first and second rails.

8. The disc head slider of claim 1 and further comprising:

a leading slider edge;

a trailing slider edge;

a center rail positioned between the first and second rails, wherein the center rail comprises a first center rail bearing surface, which trails the subambient pressure cavity, and a third convergent channel, which is recessed within the first center rail bearing surface and comprises a leading channel end open to fluid flow from the subambient pressure cavity, non-divergent channel side walls and a trailing channel end closed to the fluid flow and forward of a localized region of the first center rail bearing surface; and wherein the first and second rails terminate prior to the trailing slider edge.

9. The disc head slider of claim 8 wherein the center rail extends from the cavity dam to a location on the slider body that is past the trailing bearing surfaces of the first and second rails, which divides the subambient pressure cavity into two portions, and wherein the center rail further comprises a leading step surface, which is raised from the subambient pressure cavity, recessed from the first center rail bearing surface and extends forward from the third convergent channel.

10. The disc head slider of claim 9 wherein the center rail further comprises a second center rail bearing surface, which is formed at least partially within the cavity dam and is coplanar with the first center rail bearing surface, wherein the leading step surface extends from a trailing edge of the second center rail bearing surface to a leading edge of the first center rail bearing surface.

11. A disc drive assembly comprising:

a housing;

a disc rotatable about a central axis within the housing, wherein the disc comprises a recording surface with a data area and a landing area, which are non-textured;

an actuator mounted within the housing; and a slider supported over the recording surface by the actuator and comprising:

a cavity dam;

a subambient pressure cavity, which trails the cavity dam and has a cavity floor;

first and second elongated rails disposed about the subambient pressure cavity, wherein each of the rails comprises a rail width measured from an inner rail edge to an outer rail edge, a leading bearing surface, a trailing bearing surface, and a recessed area extending between the leading and trailing bearing surfaces, which is recessed from the bearing surfaces and raised from the cavity floor, across the rail width; and first and second convergent channels, which are recessed within the trailing bearing surfaces of the first and second rails, respectively, wherein each channel comprises a leading channel end open to fluid flow from the respective recessed area, non-divergent channel side walls and a trailing channel end closed to the fluid flow and forward of a localized region of the respective trailing bearing surface.

12. The disc drive assembly of claim 11 wherein the slider further comprises:

a leading slider edge;

a trailing slider edge;

a length measured from the leading slider edge to the trailing slider edge;

a positive crown curvature in the bearing surfaces along the slider length, wherein the crown curvature has a peak between the leading slider edge and the trailing slider edge; and the recessed areas of the first and second rails are positioned at the peak, along the slider length.

13. The disc drive assembly of claim 11 wherein:

the first and second convergent channels each comprise a channel floor, which is coplanar and contiguous with the recessed areas of the first and second rails, respectively.

14. The disc drive assembly of claim 13 wherein the cavity dam, the channel floor and the recessed areas are recessed from the leading and trailing bearing surfaces by 0.1 to 0.5 microns, and the subambient pressure cavity is recessed from the leading and trailing bearing surfaces by 1 to 3 microns.

15. The disc drive assembly of claim 11 wherein the subambient pressure cavity has a shape that is defined by the cavity dam and the inner edges of the first and second rails, as the inner edges extend along the leading bearing surfaces, the recessed areas and the trailing bearing surfaces.

16. The disc drive assembly of claim 11 wherein the slider further comprises a leading slider edge, a trailing slider edge and a length measured from the leading slider edge to the trailing slider edge and wherein:

the non-divergent channel side walls are spaced from one another by a channel width; and the localized region of the respective trailing bearing surface has a region length, which is measured along the slider length and is at least as long as the channel width.

17. The disc drive assembly of claim 11 wherein the slider further comprises:

at least one raised pad protruding from each of the leading and trailing bearing surfaces of the first and second rails.

18. The disc drive assembly of claim 11 wherein the slider further comprises:

a leading slider edge;

a trailing slider edge;

a center rail positioned between the first and second rails, at the trailing slider edge, wherein the center rail comprises a center bearing surface and a third conver gent channel, which is recessed within the center bearing surface and comprises a leading channel end open to fluid flow from the subambient pressure cavity, non-divergent channel side walls and a trailing channel end closed to the fluid flow and forward of a localized region of the center bearing surface; and wherein the first and second rails terminate prior to the trailing slider end.

19. A disc drive assembly comprising:

a disc rotatable about a central axis and having a data area and a slider landing zone area, which are non-textured; and slider means supported over the disc and having elongated rails with convergent channel means and recessed waist area means for generating a fluid bearing between the slider means and the disc by permitting fluid flow from the recessed waist area means into the convergent channel means as the disc rotates beneath the slider means about the central axis and for reducing stiction between the slider means and the disc when the slider means is at rest within the landing zone area.

* * * * *

UNITED STATES PATENT AND TRADEMARK OFFICE
CERTIFICATE OF CORRECTION

PATENT NO.   : 6,504,682 B1  
DATED        : January 7, 2003  
INVENTOR(S)  : Sannino et al.

Page 1 of 1

It is certified that error appears in the above-identified patent and that said Letters Patent is hereby corrected as shown below:

Column 10,
Line 36, after "rails" add -- , --.

Signed and Sealed this

Twenty-fifth Day of March, 2003

JAMES E. ROGAN
*Director of the United States Patent and Trademark Office*